Nov. 18, 1969    W. C. ROY    3,479,563

TRANSFORMER WITH FUSE

Filed Aug. 15, 1968

INVENTOR.
WAYNE C. ROY
BY Richard W. Rabkin
ATTORNEY

United States Patent Office 3,479,563
Patented Nov. 18, 1969

3,479,563
TRANSFORMER WITH FUSE
Wayne C. Roy, Springfield, N.J., assignor to Federal Pacific Electric Company, a corporation of Delaware
Filed Aug. 15, 1968, Ser. No. 752,863
Int. Cl. H02h 7/14; H01h 9/00
U.S. Cl. 317—15                                    8 Claims

ABSTRACT OF THE DISCLOSURE

A transformer is combined with a fuse. An insulating block with channels serves as a barrier to protect the terminals of the transformer. The block also has a space for the retention by clip means of the fuse of the transformer.

---

This invention relates to electrical transformers and more particularly to relatively low capacity power transformers commonly known as control transformers.

Control transformers are utilized to reduce the line voltage normally available in an industrial plant, which may be in the order of 230, 440 or 600 v., to a safe more easily handled voltage as for example 115 v. These transformers are used to a considerable extent in the production of metal enclosed motor control centers from which large numbers of motors are individually controlled and protected. In such equipment a motor starter, which includes a contactor for operating the associated motor at full line voltage, for example, 440 v. AC, will have an operating coil designed for energization at 115 v. Motor starters in control centers are usually mounted together with a disconnect switch or circuit breaker in a housing that can be plugged into a larger motor control structure as a unit. In order to reduce the floor space required for control centers the overall structure and the individual units have been made more and more compact. To simplify the wiring to and between the units each is normally provided with its own control transformer for converting the 600 v. line potential to 115 v. for control purposes.

Due to the cramped conditions within the plug-in unit described above and in control centers designed for "on-the-machine" mounting it is necessary that the control transformer be mounted adjacent one of the metal side walls of the plug-in housing. In the interest of electrical safety certain rules and regulations have been proposed and adopted by the Underwriters' Laboratories, Inc. The established standards as to separation of the electrically "live" or energized parts from the ground or metal wall adjacent thereto have heretofore required that valuable space be provided adjacent the terminal structures of the transformers. An object of this invention is to provide an improved control transformer which transformer can be mounted closely adjacent metal side walls and the like.

Another object of this invention is the provision of an improved control transformer having shielded or protected terminals.

Control transformers are produced in a variety of more or less standard capacities ranging from 15 volt-amperes (va.) to 1000 va. The physical size of the transformer is proportional to its electrical capacity. Until the present invention it had been the practice in the industry to provide a different terminal arrangement for each rating of control transformer. It will readily be understood that this resulted in considerable expense and in duplication of tooling to produce the different sizes required in accordance with the dimensions of the particular transformer. It is an object of this invention to provide an improved transformer terminal arrangement which is usable with a large range of transformer capacities.

Control transformers are often called upon to supply relatively high current surges such as when closing a large contactor or the like. This type of duty makes application of impedance-limited transformers unfeasible. (In impedance-limited transformers the short circuit current is limited by the inherent or designed impedance of the transformer to a level which will not allow damage to the transformer.) To protect a control transformer against short circuits and the like, it is necessary to provide a fuse in series therewith usually connected to the secondary winding. It has heretofore been necessary to provide a separate fuse mounting block that, by itself, must meet standards of the Underwriters' Laboratories as to clearance with respect to ground and adjacent metal parts. As explained above the required compact nature of the units have put a premium on space availability within the mounting housing. It is therefore a further object of this invention to provide an improved control transformer having an integral fuse therewith. It is yet another object of this invention to provide an improved control transformer in which a directly mounted fuse is connectible to a winding of the transformer without additional wiring.

The foregoing objects are achieved in one embodiment of the invention by a control transformer which is designed for use in a metal enclosure or housing close to one or more of the side walls of the enclosure. The transformer includes a rectangular core having elongated top and bottom surfaces. Primary and secondary windings are provided on the core and have laterally projecting portions at opposite sides of the core spaced from the top and bottom surfaces of the core. Terminal means are carried by the transformer for making electrical connection to the windings. The terminal means comprises parallel rows of terminals in the spaces above the projecting portions of the windings and elevated above the top surface of the core. The terminals are connected to the primary and secondary windings. The terminal means also includes insulating means which define opposite-side barriers and successive barriers between the terminals. The barriers form individual channels for the terminals which open upwards and extend inwards from the opposite-side barriers toward the space above the top surface of the core. The space so defined constitutes a main longitudinal channel for external terminal wiring extending to the terminals.

The nature of the invention and its various further aspects and features of novelty will be appreciated from the illustrative disclosure that is given in detail below and the accompanying drawings which form part of this disclosure.

Figure 1:
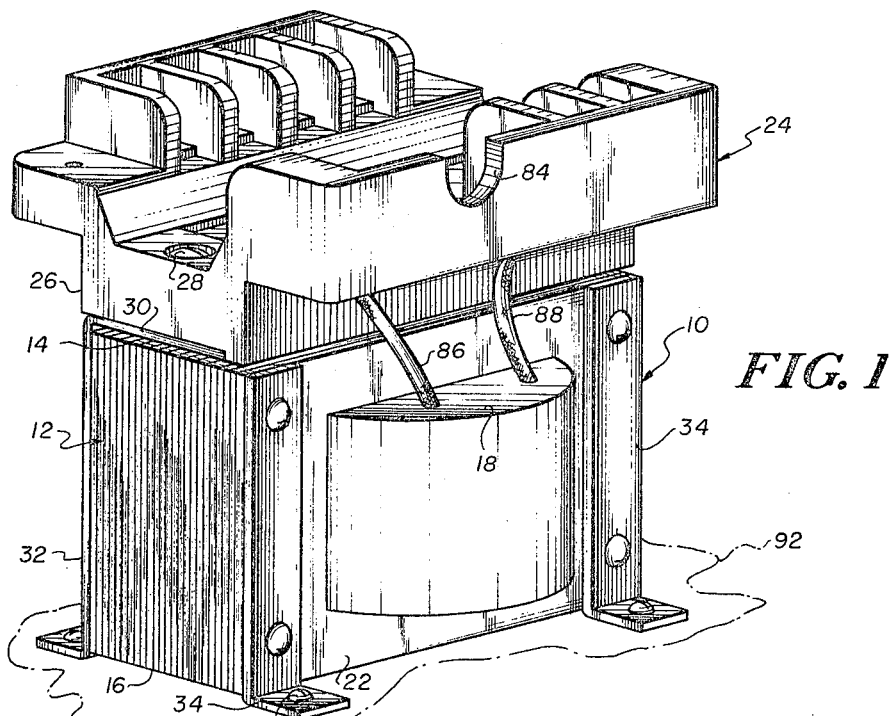
FIG. 1 is a perspective view of a low-volt ampere rated control transformer.

Referring to the drawings, the control transformer 10 includes a generally rectangular E-I type core 12 fabricated from laminations of transformer steel. The assembled core has elongated top 14 and bottom surfaces 16. Primary and secondary windings (not shown) are provided on the core in a manner well known in the art. The windings have laterally projecting portions 18, at opposite sides 20, 22 of the core, that are spaced from the top and bottom surfaces 14, 16 of the core. A terminal block 24 is affixed to the transformer to provide means for making electrical connection to the primary and secondary windings. Terminal block 24 includes a body 26 of insulation that is secured by screws 28 to bent over portions 30 of the mounting legs 32 at opposite ends of the transformer. An additional pair of mounting legs 34 are provided on the opposite face 22 of the transformer. Terminal block 24 further includes two parallel rows of terminals 36–42 and 44–46 for connection to the primary and secondary windings of the transformer, respectively. The terminal block also includes opposite-side barriers 48 and 50 and a plurality of arrayed interior barriers 52 between the terminals. End barriers 54 protect the end ones of each row of terminals. The barriers 52, 54 form individual channels for the terminals which open upwards and extend inwards from the opposite-side barriers 48, 50 toward the open space above the top surface 14 of the core 12. The space so defined is delineated by side walls 56 and a bottom wall 58 constituting a main longitudinal channel for the external wiring shown in phantom at 60. The ends of the channel are open so that the external wiring may enter the block from either end. Flat surfaces 62 are provided on the terminal block 26 adjacent each end of the row of terminals 36–42 to provide a mounting position for a wire strap (not shown) which may be utilized to maintain the external terminal wiring 60 in position.

Figure 3:
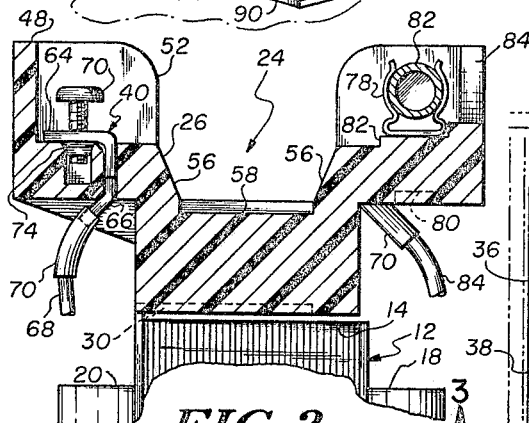
FIG. 3 is a view of the terminal means of FIG. 2 viewed in the direction 3—3 of FIG. 2.

Referring to FIG. 3 a typical terminal 40 is shown in position in the block 26. The other terminals are substantially identical so that only terminal 40 will be described in detail. Terminal 40 includes a flat conducting member 64 that has a depending tail 66 that passes through the block 26 and retains member 64 in position. The insulated transformer conductor 68 is connected to the tail 66 and the joint between the insulated wire and the tail 66 is insulated by appropriate means as for example shrink-fit insulating tubing 70. One of the external wires can be secured to the terminal 40 by means of a screw 70 that engages a threaded boss 74 on member 64.

Figure 2:
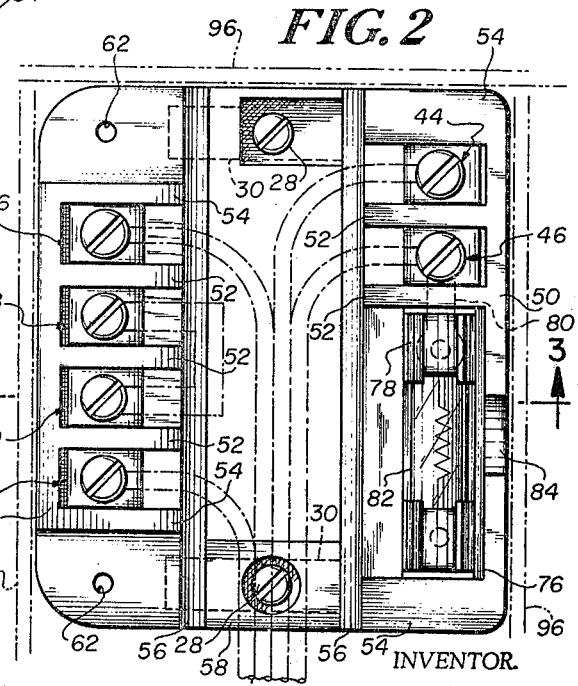
FIG. 2 is a plan view of the control transformer of FIG. 1.

Fuse clip 76 is shown in FIG. 2 and is secured to a terminal (not shown) for connection to the transformer wiring. The terminal is similar to terminals 36–46. A second fuse clip 78 is secured to a jumper 80 that connects the clip 78 and terminal 46. Jumper 80 lies within the block 24. Secondary transformer conductor 86 is connected to fuse clip 76 and the other end of the secondary winding, i.e., conductor 88 is connected to terminal 44. Fuse 82, when mounted in the cooperating clips 76, 78 lies with its longitudinal axis parallel to the wiring channel and the long axis of the transformer core 12. A notch 84 is formed in the opposite-side barrier 50 adjacent the fuse to allow for access to the fuse for removing or inserting the fuse when needed.

Terminals 38, 40 on the primary side are shown interconnected by a conventional jumper utilized for changing the connection arrangement between the coils forming the primary winding on the transformer. It is used to either connect the coils in series for use at 460 v. or in parallel at 230 v.

Transformer 10 may be mounted by screws 90 to the rear or bottom wall 92 of the housing (not shown). Due to the provision of the opposite-side barriers 48, 50 and end barriers 54 it is possible for the transformer 10 to be mounted closely adjacent a side wall 96 (as shown in phantom in FIG. 2). There is no side or end mounting preference because of the insulated accessibility of the transformer terminals for external wiring. In the novel transformer heretofore described the terminals and the associated transformer wiring are shielded fom surrounding metal parts and ground well within the Underwriters' Laboratories standards. The vertical location of terminal block 24 together with the aforedescribed structure provides a unitary control transformer having definite advantages over those heretofore available in the art.

Figure 4:
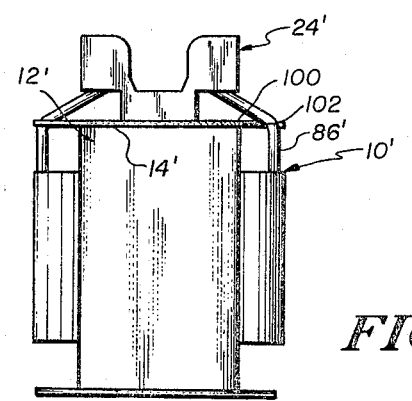
FIG. 4 is a side elevation of yet another embodiment of the invention.

Referring to FIG. 4 a terminal block 24' of the same size and type as described above is shown secured to the core 12' of a larger capacity transformer 10'. In order to provide the appropriate clearance between the terminals and the adjacent portions of the core 12', where the transformer core is wider than the terminal block 24, a sheet of insulation 100 is interposed between the base of the block and the top surface 14' of the core. Impregnated glass melamine has been found suitable. Peripheral notches 102 in the sheet of insulation 100 provide lead spacing and lead support for the transformer conductors 86' etc. associated with the primary and secondary windings of the transformer 10'. Thus the insulating barrier has dual functions and allows the advantages of close spaced mounting with respect to adjacent metal walls to be achieved although the opposite-side barriers of the terminal 24 are not the determining factors.

The transformer-terminal block arrangement shown in FIGS. 1–4 illustrates the use of the same size terminal block 24 over a wide range of transformer capacities. This, of course, results in a considerable saving in tooling and in the reduction of the number of types of terminal blocks which must be carried in inventory by the transformer manufacturer.

It will be recognized by those skilled in the art that various modifications and changes may be made in the illustrative embodiments without departing from the spirit and scope of the invention.

What is claimed is:

1. A control transformer for use in a metal enclosure close to one or more side walls thereof, said transformer including a rectangular core having elongated top and bottom surfaces, primary and secondary windings on said core having laterally projecting portions at opposite sides of said core and spaced from the top and bottom surfaces of the core, and terminal means carried by said transformer for making electrical connection to said windings, said terminal means comprising parallel rows of terminals in the spaces above said projecting portions of said windings and elevated above said top surface of the core and including terminals connected to said primary and said secondary windings, said terminal means also including insulating means defining opposite-side barriers and successive barriers between said terminals, said barriers forming individual channels for said terminals, said individual channels opening upwards and extending inwards from said opposite side barriers toward the space above said top surface of the core, said space constituting a main longitudinal channel for external terminal wiring extending to said terminals.

2. A transformer according to claim 1 wherein said opposite-side barriers define a pair of spaced apart parallel planes, mounting means for said transformer, said mounting means extending outwardly from said core adjacent to the bottom surface thereof, said mounting means being between said parallel planes.

3. A transformer according to claim 1 wherein said opposite-side barriers define a pair of spaced apart parallel planes, mounting means for said transformer, said mounting means extending outwardly from said core adjacent to the bottom surface thereof, a barrier of insulation interposed between said terminal means and said core, said mounting means extending beyond said parallel planes.

4. A transformer according to claim 1 further including conductors extending between said windings of said transformer in respective ones of said terminals and support means for said conductors interposed between said terminal means and said windings.

5. A transformer according to claim 1 further including means mounting a fuse on said terminal means, said mounting means being spaced inwardly of said opposite-side barriers.

6. A transformer according to claim 5 wherein said fuse has a longitudinal axis, said fuse mounted by said mounting means with said longitudinal axis parallel to said main longitudinal channel.

7. A transformer according to claim 5 wherein said fuse mounting means includes a first fuse receiving clip connected to one end of the winding on said core, a second fuse receiving clip spaced from and cooperating with said first clip for receiving a fuse therebetween, means connecting said second clip to one of said terminals, the other end of said winding being connected to another of said terminals whereby said fuse is connected in series with said winding and said connected terminals.

8. A transformer according to claim 5 wherein said fuse mounting means is adjacent one of said opposite-side barriers and extends parallel thereto and access means formed in said opposite-side barrier adjacent to said fuse mounting means for providing access to a fuse when mounted therein for removal and insertion.

References Cited
UNITED STATES PATENTS
1,925,861    9/1933    Baum _____ 317—157.6

E. A. GOLDBERG, Primary Examiner

U.S. Cl. X.R.

317—157.6; 336—192, 220